United States Patent [19]

Gray, Jr.

[11] Patent Number: 5,298,088
[45] Date of Patent: Mar. 29, 1994

[54] ONE-QUARTER TURN BALL VALVE CLOSER

[76] Inventor: Charles H. Gray, Jr., 5015 Memorial Blvd., Kingsport, Tenn. 37664

[21] Appl. No.: 30,546

[22] Filed: Mar. 12, 1993

[51] Int. Cl.$^5$ .............................................. F16K 31/64
[52] U.S. Cl. ........................................ 137/75; 137/77; 251/74
[58] Field of Search ................... 137/72, 75, 79, 77; 251/67, 74

[56] References Cited

U.S. PATENT DOCUMENTS

| | | | |
|---|---|---|---|
| 1,966,735 | 7/1934 | Sackett | 251/74 X |
| 2,008,961 | 7/1935 | Lessard | 137/72 |
| 4,004,601 | 1/1977 | Bachelder et al. | 251/74 X |
| 4,890,635 | 1/1990 | Gray, Jr. | 137/75 |
| 4,960,147 | 10/1990 | Diamond | 251/74 X |
| 5,004,003 | 4/1991 | Gray, Jr. | 137/75 |

Primary Examiner—Martin P. Schwadron
Assistant Examiner—Kevin L. Lee
Attorney, Agent, or Firm—Jacobson, Price, Holman & Stern

[57] ABSTRACT

A valve closer for a valve installed in a flow line of a flammable liquid or other hazardous flowable material which is normally open with the closer of the present invention automatically moving the valve to closed position by turning the valve one-quarter of a turn when a fusible link is rendered inoperative when subjected to predetermined high temperature conditions which may occur in the event of a fire. The fusible link, when rendered inoperative, will release a pivotal latch that is engaged with and will release a spring biased actuating member that will rotate the valve stem one-quarter turn to close the valve and interrupt the flow of material through the flow line in which the valve is installed. The valve stem is provided with a cam in the form of a generally circular flange rigid therewith having an arcuate recess with one edge of the recess being engaged by an offset portion of the spring biased actuating member with the construction of the recess and offset portion of the actuating member limiting the rotational movement of the cam, valve stem and valve to one-quarter turn.

9 Claims, 1 Drawing Sheet

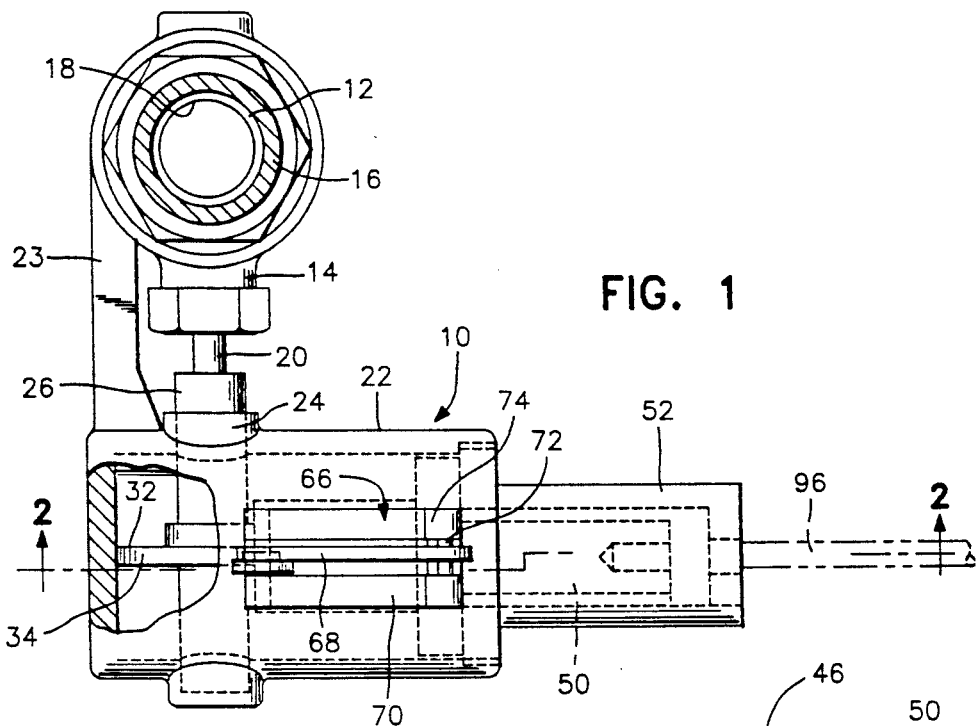

ONE-QUARTER TURN BALL VALVE CLOSER

BACKGROUND OF THE INVENTION

1. Field of the Invention

This invention relates to a valve closer in which the valve is installed in a flow line of a flammable liquid or other hazardous flowable material which is normally open with the closer of the present invention automatically moving the valve to closed position by turning the valve one-quarter of a turn when a fusible link is rendered inoperative when subjected to predetermined high temperature conditions which may occur in the event of a fire. The fusible link, when rendered inoperative, will release a pivotal latch that is engaged with and will release a spring biased actuating member that will rotate the valve stem one-quarter turn to close the valve and interrupt the flow of material through the flow line in which the valve is installed. The valve stem is provided with a cam in the form of a generally circular flange rigid therewith having an arcuate recess with one edge of the recess being engaged by an offset portion of the spring biased actuating member with the construction of the recess and offset portion of the actuating member limiting the rotational movement of the cam, valve stem and valve to one-quarter turn.

2. Description of the Prior Art

Fire control valve structures which release a normally open valve for movement to a closed position to interrupt flow of flammable material through a flow line are generally well known. Examples of such devices are found in prior U.S. Pat. No. 4,890,635 issued Jan. 2, 1990 and U.S. Pat. No. 5,004,003 issued Apr. 2, 1991 in which I am the inventor. The prior patents cited in the above patents also relate to this field of endeavor. However, the prior art does not include the structural arrangement in which the valve is rotated one-quarter turn by the use of the structure disclosed in this application.

SUMMARY OF THE INVENTION

An object of the present invention is to provide a valve closer easily incorporated into a ball valve structure having a stem projecting outwardly from the valve housing with the closer of the present invention being mounted on the valve structure in a manner to rotate the valve stem one-quarter turn to close the valve when a fusible link is ruptured due to high temperature conditions which may occur during a fire.

Another object of the invention is to provide a one-quarter turn ball valve closer which includes a spring biased actuating member oriented in perpendicular relation to the valve stem with the actuating member being retained in a retracted position by a pivotal latch retained in operative position by a fusible link with rupture of the fusible link releasing the latch which releases the actuating member to move toward the valve stem.

A further object of the invention is to provide a valve closer in accordance with the preceding object in which the valve stem is provided with a cam in the form of a generally circular flange thereon in alignment with a center line of the actuating member with the flange including an arcuate notch or recess therein having a configuration that cooperates with the actuating member to rotate the stem one-quarter turn when the actuating member is released by the latch and moves toward the flange on the valve stem.

Still another object of the invention is to provide a valve closer in accordance with the preceding object in which the actuating member includes an offset longitudinally extending portion which engages the notch or recess in the cam adjacent the outer periphery thereof to provide a rotational torque to the valve stem with the offset portion of the actuating member being guided in its longitudinal movement by a set screw projecting into the housing of the actuating member and engaging a groove in the outer surface of the offset portion of the actuating member.

A still further object of the invention is to provide a valve closer in accordance with the preceding objects in which the structural relationships between the actuating member, offset portion thereon, guide structure and the configuration of the notch or recess in the cam or flange on the stem coact to limit the rotational movement of the valve stem to one-quarter turn thereby assuring that the ball valve will be rotated one-quarter turn in order to fully close the ball valve.

These together with other objects and advantages which will become subsequently apparent reside in the details of construction and operation as more fully hereinafter described and claimed, reference being had tot he accompanying drawings forming a part hereof, wherein like numerals refer to like parts throughout.

BRIEF DESCRIPTION OF THE DRAWINGS

FIG. 1 is a plan view of a valve closer, with portions of the housing broken away to illustrate a portion of the periphery of the circular flange on the valve stem.

FIG. 2 is a longitudinal, sectional view of the one-quarter turn ball valve closer of the present invention illustrating the structural and functional details thereof.

FIG. 3 is a perspective view of the actuating member incorporated into the valve closer of this invention.

DESCRIPTION OF THE PREFERRED EMBODIMENT

Referring now specifically to the drawings, the one-quarter turn ball valve closer of the present invention is generally designated by a reference numeral 10 and, as illustrated in FIGS. 1 and 2, the closer 10 is associated with a ball valve 12 oriented within a ball valve housing 14 incorporated into a flow line 16 which normally conveys a flammable liquid or hazardous materials with the ball valve including a flow passage 18 therethrough which is normally aligned with the flow path but which will become misaligned with the flow path to prevent flow through the flow line 16 when the ball valve 12 is rotated 90° or one-quarter turn. The ball valve 12 is provided with a stem 20 which is connected with the ball valve for rotating the ball valve between open and closed positions with the stem 20 extending outwardly of the housing 14 in a conventional manner. The specific structure of the ball valve and the manner in which it is associated with the ball valve housing and flow line are conventional and well known structures.

The closer of the present invention incorporates a generally cylindrical housing 22 which is stationarly supported in any suitable manner from the valve housing 14 such as by bracket 23 and includes lateral bosses 24 which rotatably receive the stem 20 and a concentrically mounted cylindrical adapter 26 thereon which is keyed to and rigid with the stem 20 in which the stem 20 includes a flat longitudinally extending portion 28 which receives a correspondingly shaped flat inner surface 30 on the cylindrical adapter 26 as illustrated in FIG. 2. Rigidly affixed to the adapter 26 and thus the stem 20 is a cam in the form of a peripheral flange 32 which has a generally cylindrical external surface area 34 interrupted by an arcuate notch or recess 36. One edge of the recess 36 as designated by reference numeral 38 is a relatively long radial surface area combined with a relatively short outer edge portion 40 forming a continuation thereof as illustrated in FIG. 2. The other edge of the notch 36 is provided with a relatively short radial surface 42 and a relatively longer end edge surface 44 as illustrated in FIG. 2.

The housing 22 includes a reciprocally mounted actuating member 46 which includes a cylindrical piston 48 that fits closely within the cylindrical interior of the housing 22 for reciprocal movement therein. One side of the piston 48 includes a cylindrical piston rod 50 centrally located thereon and projecting in perpendicular relation thereto. The piston rod 50 is concentrically received in a housing extension 52 that is detachably connected to an end of the housing 22 by a screw threaded connection 58 or other suitable connection such as a flange connection retained in place by cap screws or the like. The housing extension has a closed outer end 60 provided with a central opening 62 therein. A coil compression spring 64 is oriented in encircling relation to the piston rod 50 with one end of the spring engaging the inner surface of the closed end 60 of the housing extension 52 and the other end of the spring 64 engages the piston 48 to bias the actuating member 46 toward the valve stem 20.

A latch mechanism generally designated by reference numeral 66 is mounted on the housing 22 to retain the actuator 46 in retracted position with the spring 64 compressed. The latch mechanism 66 includes a pivotal latch member 68 that is supported by a bracket structure 70 and a pivot pin 72 which extends between lugs 74 on the bracket structure 70. The bracket structure 70 is secured to the housing 22 by suitable fastener screws 76. The housing 22 includes a longitudinally elongated slot 54 through which a latching member 78 extends for engaging the face of the piston 48 on the opposite side from the spring 64 as illustrated in FIG. 2. A fusible link structure generally designated by numeral 80 interconnects the end of the latch member 6 and the bracket 70 in remote relation to the pivot pin 7 with the fusible link 80 retaining the latch member 68 in a position with the latching member 78 engaging the piston 48. When the fusible link is ruptured or rendered inoperative by high temperature conditions, the fusible link 80 will release the latch member 68 and permit it to pivot outwardly about pivot pin 72 to permit the latching member 78 to swing arcuately through the slot 54 and out of the path of the piston 48 thereby enabling the spring 64 to move the piston 48 toward the valve stem 20 as illustrated in the dotted line position of the piston 48 in FIG. 2.

The piston 48 is provided with a radially offset longitudinal extension 82 which has a flat inner surface 84 and an arcuate outer surface 86 having a longitudinal groove 88 formed centrally in the bottom of the arcuate surface 86 with the groove 88 being disposed adjacent to the bottom of the housing 22 as illustrated in FIG. 2 for receiving the inner projecting end 90 of a set screw or cap screw 92 which is threaded through the housing with the inner unthreaded end 90 thereof received in the groove 88 for maintaining the offset projection 82 at the bottom of the housing 22 thus maintaining the relationship of the projection 82 in relation to the stem and flange 32 so that the flat upper portion 84 of the projection 82 will move under the peripheral surface of the stem and adaptor 26 thereon in tangential relation as illustrated in FIG. 2 in the dotted line position of the projection 82.

As the piston 48 and projection 82 are moved to the left as observed in FIG. 2, the flat outer end of the projection 82 will engage the end surface 40 of the notch or recess 36 and commence rotation of the flange 32 in a clockwise direction. Continued movement of the projection 82 causes continued movement of the flange 32 in a clockwise direction with the upper corner of the end edge and top surface of the projection 82 then engaging the elongated radial edge surface 38 of the notch or recess 36. The end edge surface 44 of the notch or recess 36 will come into contact with the upper surface 84 of the projection 82 to limit the rotational movement of the flange 32 to a movement of approximately 90° or one-quarter turn thus assuring that the passageway 18 in the ball valve 12 will be oriented in misaligned relation to the flow path and generally in perpendicular relation thereto to effectively close the ball valve.

The fusible link 80 and the latch 66 and the operation of the spring and piston are quite similar to the structure and function as disclosed in prior U.S. Pat. No. 5,004,003 with the melting point of the fusible link being variable depending upon the conditions expected to be encountered. As in that patent, the fusible link may have a pull pin associated with it that can be remotely controlled in order t enable the valve to be quickly closed in case of an emergency not related to temperature rise. Also, the piston rod 50 is provided with a threaded socket 94 in alignment with the aperture 62 to enable the actuating member 46 to be retracted by the insertion of a threaded rod 96 therein by which the actuator can be retracted in order to reset the latch 66 by replacing the fusible link and connecting it between the latch member 68 and the bracket 70 which will then hold the actuating member 46 in retracted position.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A closer for a valve having a rotatable valve body with flow passage therethrough adapted to be connected to a flow line through which flammable material flows with the valve body normally being in an open position with the flow passage therethrough aligned with the flow line, said valve body including a valve stem extending outwardly of a valve housing, said closer comprising a housing in which the valve stem is rotatably positioned, said valve stem including a generally circular cam rigid with the stem and in perpendicular relation thereto, said cam including an arcuate peripheral notch, said closer housing including a spring biased actuating member reciprocally mounted therein for movement toward and away from the valve stem and cam, latch means retaining the actuating member in retracted position in spaced relation to the valve stem and cam, a temperature responsive means releasing the latch means in response to predetermined high temperature conditions to enable the actuating member to move toward said stem and cam, and means on said actuating member to engage an edge portion of said notch in spaced relation to the rotational axis of the stem for rotating the stem to move the valve from open position to closed position to terminate flow of flammable material through the flow line.

2. The valve closer as defined in claim 1 wherein said actuating member includes a longitudinally extending projection mounted within the closer housing and moveable to a position generally tangential to the valve stem, means guiding movement of the projection during its longitudinal movement to retain the projection in alignment with the cam, said projection including a flat inner end and a flat top surface, said notch in the cam including angulated edges engaged by the projection to limit the rotational movement of the cam and stem to one-quarter turn to rotate the flow passage in the valve body to generally perpendicular relation to the flow line.

3. The closer valve as defined in claim 2 wherein said actuating member includes a piston reciprocally mounted in a cylindrical interior of the closer housing, said projection being mounted on said piston in offset relation toward one edge thereof and projecting axially toward the valve stem in offset relation to the valve stem to exert rotational torque thereon when the projection engages an angulated edge of said notch in the cam.

4. The closer valve as defined in claim 3 wherein said projection includes an arcuate outer surface, a flat inner edge and a flat surface generally paralleling the valve stem and moveable into tangential relation thereto.

5. The valve closer as defined in claim 4 wherein said means guiding the projection includes a longitudinally extending groove in the arcuate surface of the projection, said closer housing including a guide screw having an inner end extending into said groove for preventing rotational movement of the piston during reciprocation and maintaining the flat surface on the projection in general parallel relation to the stem for movement into tangential relation to the stem with the other angulated edge of the notch engaging the flat surface of the projection to limit the rotational movement of the cam and stem to substantially one-quarter turn.

6. In combination, a valve having a rotatable valve body with a flow passage therethrough adapted to be connected to a flow line through which flammable material flows with the valve body normally being in an open position with the flow passage therethrough aligned with the flow line, said valve body including a valve stem extending outwardly of a valve housing, and a closer comprising a closer housing in which the valve stem is rotatably positioned, said valve stem including a generally circular cam positioned in the closer housing and being rigid with the stem and in perpendicular relation thereto, said cam including an arcuate peripheral notch, said closer housing including a spring biased actuating member reciprocally mounted therein for movement toward and away from the valve stem and cam, latch means retaining the actuating member in retracted position in spaced relation to the valve stem and cam, a temperature responsive means releasing the latch means in response to predetermined high temperature conditions to enable the actuating member to move toward said stem and cam, and means on said actuating member to engage an edge portion of said notch in spaced relation to the rotational axis of the stem for rotating the stem to move the valve from open position to closed position to terminate flow of flammable material through the flow lines.

7. The combination as defined in claim 6 wherein said actuating member includes a longitudinally extending projection mounted within the closer housing and moveable to a position generally tangential to the valve stem, means guiding movement of the projection during its longitudinal movement to retain the projection in alignment with the cam, said projection including a flat inner end and a flat top surface, said notch in the cam including angulated edges engaged by the projection to limit the rotational movement of the cam and stem to one-quarter turn to rotate the flow passage in the valve body to generally perpendicular relation to the flow line.

8. The closer valve as defined in claim 7 wherein said actuating member includes a piston reciprocally mounted in a cylindrical interior of the closer housing, said projection being mounted on said piston in offset relation toward one edge thereof and projecting axially toward the valve stem in offset relation to the valve stem to exert rotational torque thereon when the projection engages an angulated edge of said notch in the cam.

9. The valve closer as defined in claim 8 wherein said means guiding the projection includes a longitudinally extending groove in the outer surface of the projection, said closer housing including a guide screw having an inner end extending into said groove for preventing rotational movement of the piston during reciprocation and maintaining a flat surface on the projection in general parallel relation to the stem for movement into tangential relation to the stem wit the other angulated edge of the notch engaging the flat surface of the projection to limit the rotational movement of the cam and stem to substantially one-quarter turn.

* * * * *